United States Patent
Lin et al.

(10) Patent No.: US 8,422,492 B2
(45) Date of Patent: Apr. 16, 2013

(54) METHOD FOR GENERATING AND IDENTIFYING IDENTIFIER AND COMMUNICATION SYSTEM

(75) Inventors: Ting-Yu Lin, Taipei County (TW); Tzu-Ming Lin, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 399 days.

(21) Appl. No.: 12/324,898

(22) Filed: Nov. 28, 2008

(65) Prior Publication Data
US 2010/0103930 A1    Apr. 29, 2010

(30) Foreign Application Priority Data
Oct. 28, 2008    (TW) ................................ 97141461 A

(51) Int. Cl.
*H04L 12/28* (2006.01)
*H04L 12/56* (2006.01)

(52) U.S. Cl.
USPC ........................ 370/389; 370/393; 370/401

(58) Field of Classification Search .................. 370/389, 370/393, 401
See application file for complete search history.

(56) References Cited

U.S. PATENT DOCUMENTS

| | | | |
|---|---|---|---|
| 7,315,541 B1 | 1/2008 | Housel et al. | |
| 7,440,696 B2 | 10/2008 | Ohkuma | |
| 7,796,541 B1* | 9/2010 | Goel et al. | 370/256 |
| 2005/0018683 A1* | 1/2005 | Zhao et al. | 370/393 |
| 2005/0041573 A1* | 2/2005 | Eom et al. | 370/208 |
| 2006/0104278 A1* | 5/2006 | Chang et al. | 370/392 |
| 2007/0121504 A1* | 5/2007 | Hellenthal et al. | 370/230 |
| 2007/0141988 A1 | 6/2007 | Kuehnel et al. | |
| 2007/0286138 A1 | 12/2007 | Kaftan | |
| 2008/0014955 A1 | 1/2008 | Shannon et al. | |
| 2008/0123645 A1 | 5/2008 | Pichna et al. | |
| 2010/0020806 A1* | 1/2010 | Vahdat et al. | 370/395.31 |
| 2010/0023726 A1* | 1/2010 | Aviles | 711/216 |

FOREIGN PATENT DOCUMENTS
CN    1330475    1/2002
TW    200620907    6/2006

OTHER PUBLICATIONS

"1st Office Action of China Counterpart Application", issued on Nov. 16, 2011, p. 1-p. 5, in which the listed reference was cited.
"Office Action of Taiwan Counterpart Application", issued on Jul. 5, 2012, p. 1-p. 5, in which the listed references were cited.

* cited by examiner

*Primary Examiner* — John Blanton
(74) *Attorney, Agent, or Firm* — Jianq Chyun IP Office

(57) ABSTRACT

A method for generating and identifying an identifier and a communication system are provided. In the method, a subclass of a port in a packet is retrieved. In addition, the subclass of the port serves as a part of the identifier. A first device transmits the packet to a second device according to the identifier.

14 Claims, 7 Drawing Sheets

| Source address (SA) | Source port (SP) | Destination address (DA) | Destination port (DP) | Service flow identifier (SFID) |
|---|---|---|---|---|
| 140.113.10.100 | 80 | 140.96.70.96 | 81 | 0x80aabbcc |
| 140.177.150.67 | 21 | 140.96.88.123 | 22 | 0x80aabbcd |
| 140.114.120.22 | 40 | 140.96.115.34 | 47 | 0x80aabbce |
| 140.115.98.145 | 234 | 140.96.176.26 | 456 | 0x80aabbcf |
| ⋮ | ⋮ | ⋮ | ⋮ | ⋮ |
| 32 bits | 16 bits | 32 bits | 16 bits | 32 bits |

| Connection identifier (CID) |
|---|
| 0x11aa |
| 0x11ab |
| 0x11ac |
| 0x11ad |
| ⋮ |
| 16 bits |

FIG. 1 (PRIOR ART)

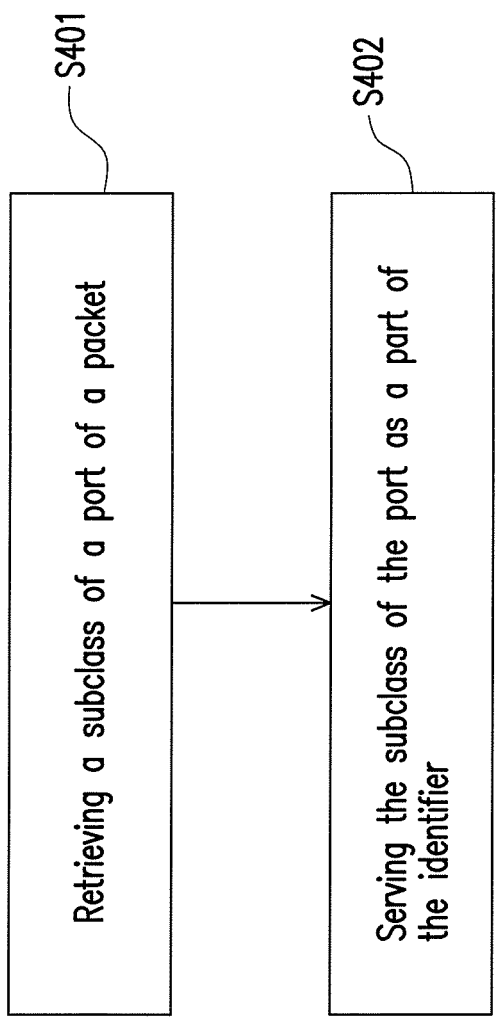

METHOD FOR GENERATING AND IDENTIFYING IDENTIFIER AND COMMUNICATION SYSTEM

CROSS-REFERENCE TO RELATED APPLICATION

This application claims the priority benefit of Taiwan application serial no. 97141461, filed on Oct. 28, 2008. The entirety of the above-mentioned patent application is hereby incorporated by reference herein and made a part of this specification.

BACKGROUND OF THE INVENTION

1. Field of the Invention

The present invention relates to an identifier assignment technique. More particularly, the present invention relates to an identifier assignment technique for a communication system.

2. Description of Related Art

In 802.16 communication system, a base station (BS) can manage packets of a same service flow by using a service flow identifier (SFID), for example, management of resource distribution, schedule, quality of service (QoS) and priority, etc. Each time when the BS receives a transmission control protocol/internet protocol (TCP/IP) packet, the BS assigns a SFID to a TCP/IP connection where the packet is belonged for management. When the packet is required to be sent, a connection identifier (CID) is further assigned, and a medium access control (MAC) header containing the CID is added in front of a packet data unit (PDU), and then the packet is sent via a MAC common part sublayer (MAC CPS) and a physical layer. In the following content, how to obtain the SFID and the CID according to the conventional technique is described in detail.

FIG. 1 is a schematic diagram illustrating assignment of a SFID and a CID according to a conventional technique. Regarding the conventional technique, a source address (SA), a source port (SP), a destination address (DA), a destination port (DP) of the packet and a mapping relation of the SFID and the CID are generally recorded within a memory table according to a table lookup method for inquiry and comparison. Each time when a packet is received, the corresponding SFID and CID are inquired according to the SA, SP, DA and DP of the packet. A length of each of the SA, DA and SFID is 32 bits, and a length of each of the SP, DP and CID is 16 bits.

More particularly, a packet to be sent from 140.113.10.100:80 to 140.96.70.96:81 is corresponded to a service flow buffer of SFID 0x80aabbcc (wherein "0x" represents hexadecimal digits), and when the packet is sent via the MAC CPS, the packet is sent by using a header containing CID 0x11aa. Similarly, the packet sent form 140.115.98.145:234 to 140.96.176.26:456 is managed by SFID 0x80aabbcf, and is sent by using a header containing CID 0x11ad.

It should be noted that, according to the conventional method, if $2^{32}$ service flows are managed, a memory space of $2^{32}*(32+16+32+16+32)=512$ Gb has to be prepared, which requires a relatively great hardware cost. Moreover, each time when a packet is sent to the BS via a network, a table lookup operation has to be performed to find to the corresponding SFID, which leads to a relatively great calculation amount. To be specific, a complexity of the table lookup operation is O(Nlog N), wherein N represents a number of data stored in the table.

SUMMARY OF THE INVENTION

The present invention is directed to a method for generating and identifying an identifier.

The present invention is directed to a communication system.

The present invention provides a method for generating and identifying an identifier, which is adapted to a first device in a communication system. According to the method for generating and identifying an identifier, a subclass of a port or an address of a packet is retrieved. In addition, the subclass of the port or the address serves as a part of the identifier, wherein the first device transmits the packet to a second device according to the identifier.

The present invention provides a communication system including a first device and a second device. The first device retrieves a subclass of a port or an address of a packet, and serves the subclass of the port or the address as a part of an identifier. Moreover, the first device transmits the packet to the second device according to the identifier.

In the present invention, a subclass of a SA, a SP, a DA, or a DP of the packet is retrieved to serve as a part of the identifier.

In order to make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a schematic diagram illustrating assignment of a SFID and a CID according to a conventional technique.

FIG. 4 is a flowchart illustrating a method for generating and identifying an identifier according to an embodiment of the present invention.

DESCRIPTION OF EMBODIMENTS

Figure 2:
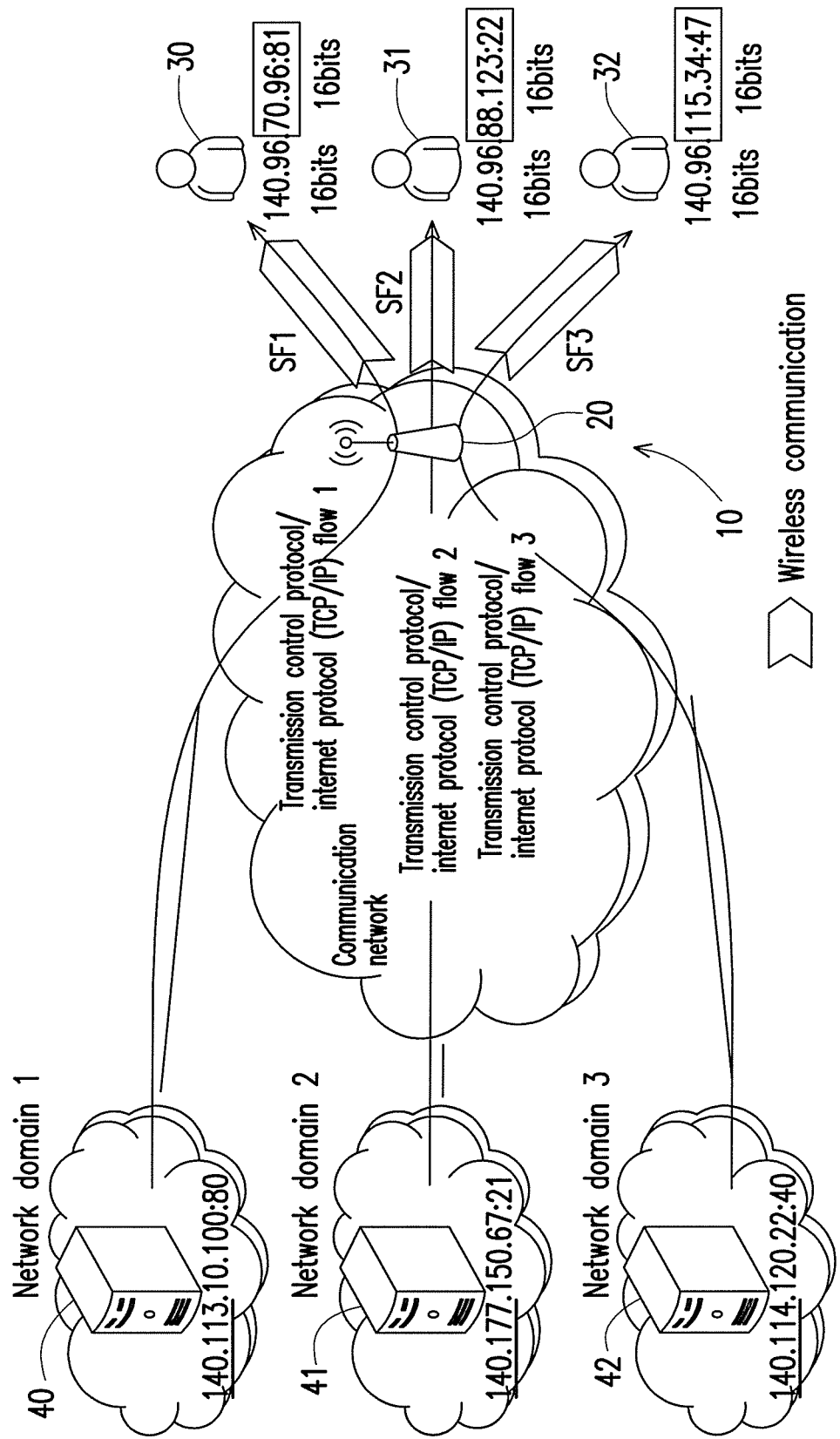
FIG. 2 is a schematic diagram illustrating a communication system according to an embodiment of the present invention.

A conventional method for assigning a SFID and a CID not only requires a great memory space, but a complexity thereof is also relatively high. Accordingly, embodiments of the present invention provides a technique for generating and identifying an identifier, by which the SFID and the CID can be generated (assigned) according to a SA and a SP of a packet, or the SFID and the CID can be generated (assigned) according to a DA and a DP of the packet, based on a transmission direction of the packet. Moreover, when the packet is received, the above two identifiers of the packet can be quickly identified. To fully convey the concept of embodiments of the present invention, embodiments are provided below with reference of figures for describing embodiments of the present invention in detail, wherein like reference numerals in the drawings denote the same or like steps.

FIG. 2 is a schematic diagram illustrating a communication system according to an embodiment of the present invention. Referring to FIG. 2, the communication system 10 includes a transmitting station and receiving stations. In the present embodiment, the communication system 10 is, for example, a wireless communication system, and the transmitting station is, for example, a base station (BS) 20. The receiving stations are, for example, subscriber stations (SS) 30, 31 and 32. In other embodiment, the communication system 10 can also be a cable communication system. When servers (for example, 40, 41 and 42) of remote network domains transmit TCP/IP packets to the SSs, since a class B network is formed by the SSs under the BS, and front two bytes of internet protocol addresses (IP addresses) of the SSs are all the same, the BS 20 can identify the SSs only according to a plurality of the bits of the IP addresses assigned to the SSs, for example the rear sixteen bits, and recording of all of the IP addresses and ports in the packet header is unnecessary. Moreover, since a plurality of application programs in each of the SSs may simultaneously transmit data, and the packet transmitted by each of the application programs can be assigned to different ports for transmission, the packet can be uniquely and absolutely mapped from one TCP/IP flow to a service flow (SF) according to the IP address and the port of the SS.

More particularly, the service flow SF1 can determine that the packet is belonged to the service flow SF1 only by reading a SS IP address 70.96 (16 bits) and a port 81 (16 bits) from the header of the packet, and looking up a table by using the SA (140.113.10.100), SP (80) and other information is unnecessary. Though the above SS IP address 70.96 and port 81 are respectively designed for 16 bits, the present invention is not limited thereto, and in other embodiments, the SS IP address and port can also be designed for other number of bits. Similarly, the service flows SF2 and SF3 can determine which of the service flows the packet is belonged to only according to 88.123 (DA): 22 (DP) and 115.34 (DA): 47 (DP).

According to another aspect, a part of the SS IP address and the SS port in the packet header can be used for identification, and serves as a basis for assigning and converting the SFID. Moreover, a part of or all of the SS port in the packet header can be used for identification, and serves as a basis for assigning and converting the CID. In the following content, how to generate the SFID and CID according to the SS port and the IP address is described in detail.

Figure 3:
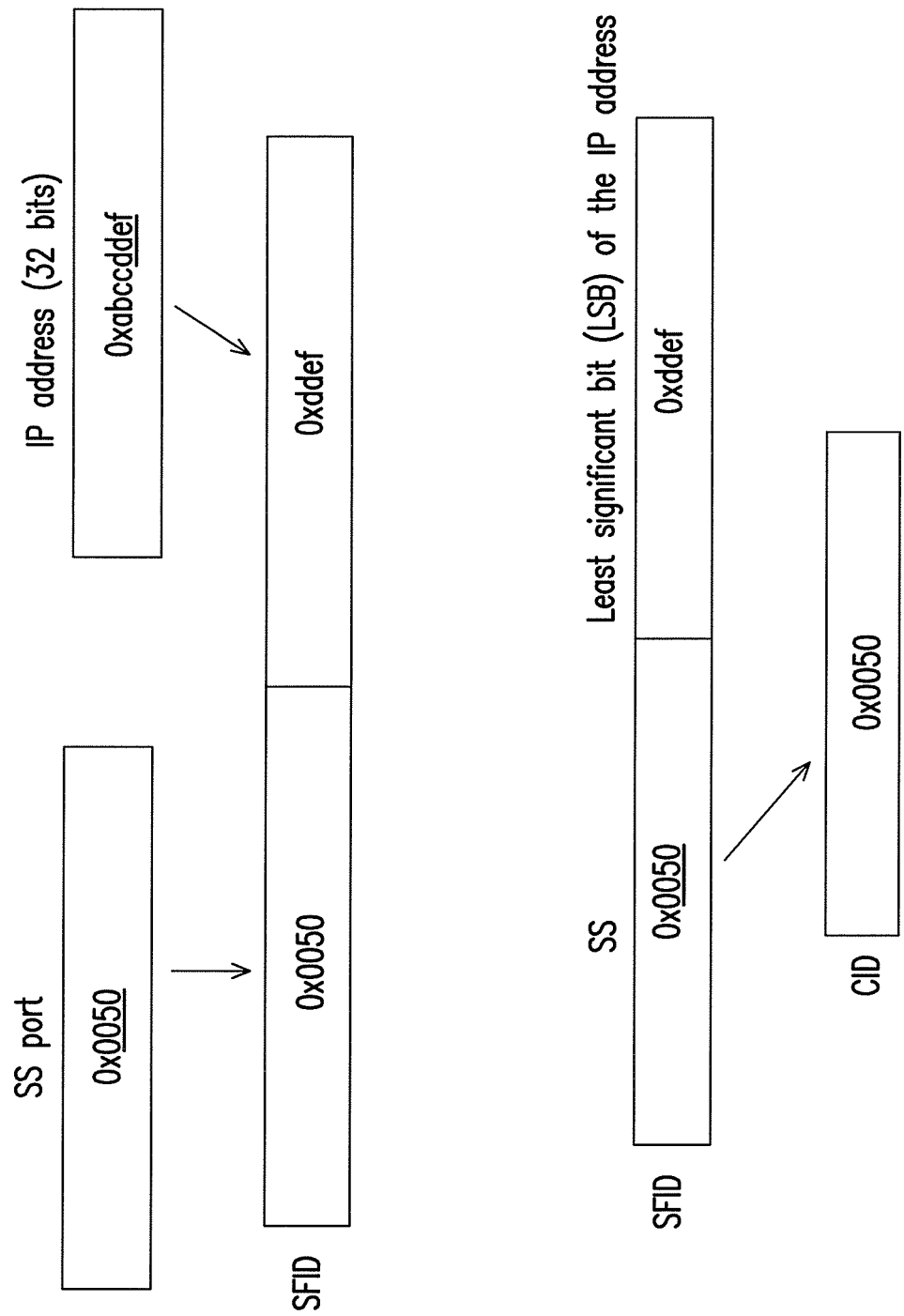
FIG. 3 is a schematic diagram illustrating a method for generating and assigning a SFID and a CID according to an embodiment of the present invention.

FIG. 3 is a schematic diagram illustrating a method for generating and assigning a SFID and a CID according to an embodiment of the present invention. Referring to FIG. 3, the front 16 bits of the SFID can be directly obtained according to the SS port, for example, 0x0050. The rear 16 bits of the SFID can be the 16 bits of the SS IP address. In brief, the SFID is formed by serially connecting the SS port (16 bits) and the 16 bits of the SS IP address.

To simplify generation of the SFID and the CID, the front 16 bits SS port of the SFID can be directly used for assigning the 16 bits CID, though the present invention is not limited thereto. In other embodiments, if the SFID is assigned or converted according to other methods, the CID can still be assigned according to the SS port, for example simplify, cutting or other kinds of conversion. Since generation and mapping of the SFID and the CID can be directly obtained from the packet header, the BS 20 is unnecessary to record the related mapping information. In the following content, assignment and conversion mechanism of the two identifiers SFID and CID for uplink and downlink are described in detail.

Uplink

Figure 5A:
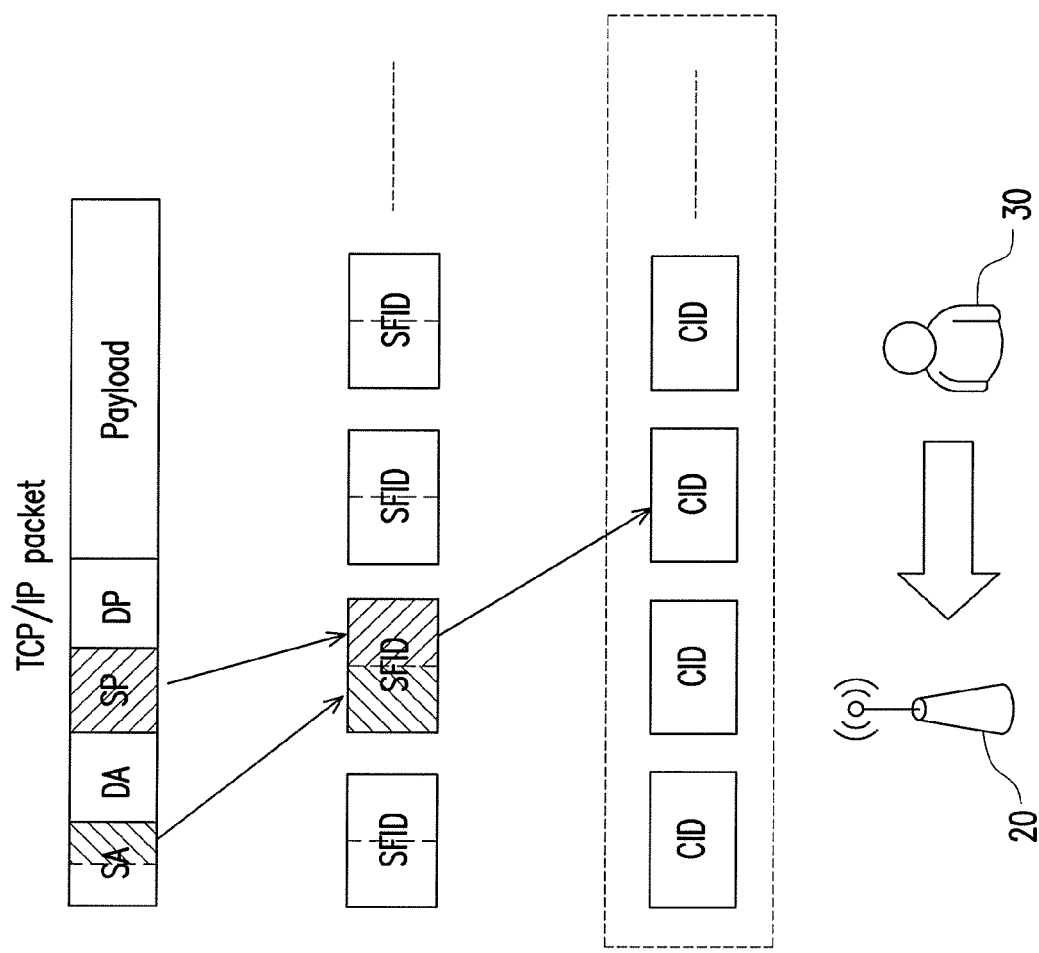
FIG. 5A is a schematic diagram illustrating a method for generating and utilizing an uplink identifier according to an embodiment of the present invention.

FIG. 4 is a flowchart illustrating a method for generating and identifying an identifier according to an embodiment of the present invention. FIG. 5A is a schematic diagram illustrating a method for generating and utilizing an uplink identifier according to an embodiment of the present invention. Referring to FIG. 2, FIG. 4 and FIG. 5A, assuming the packet is transmitted from the SS 30 to the sever 40 through the BS 20. When the SS 30 is about to transmit the packet to the BS 20, the SS 30 retrieves 16 bits of the SP in the packet, and 16 bits of the SA in the packet (step S401). Now, the SP and SA in the packet respectively represent the port and the IP address of the SS 30. Namely, the 16 bits of the SP and SA are respectively 81 (16 bits) and 70.96 (16 bits).

Next, the SS 30 retrieves the 16 bits of the SP of the packet to serve as the rear 16 bits of the SFID, and retrieves the 16 bits of the SA of the packet to serve as the front 16 bits of the SFID (step S402). Namely, the SFID is 0x46600051 (32 bits). On the other hand, the SS 30 can also retrieve the 16 bits of the SP of the packet to serve as the CID (step S402). Namely, the CID is 0x0051 (16 bits). In the present embodiment, the CID is a transport-CID. Next, the SS 30 transmits the packet to the BS 20 according to the SFID and the CID.

Downlink

Figure 5B:
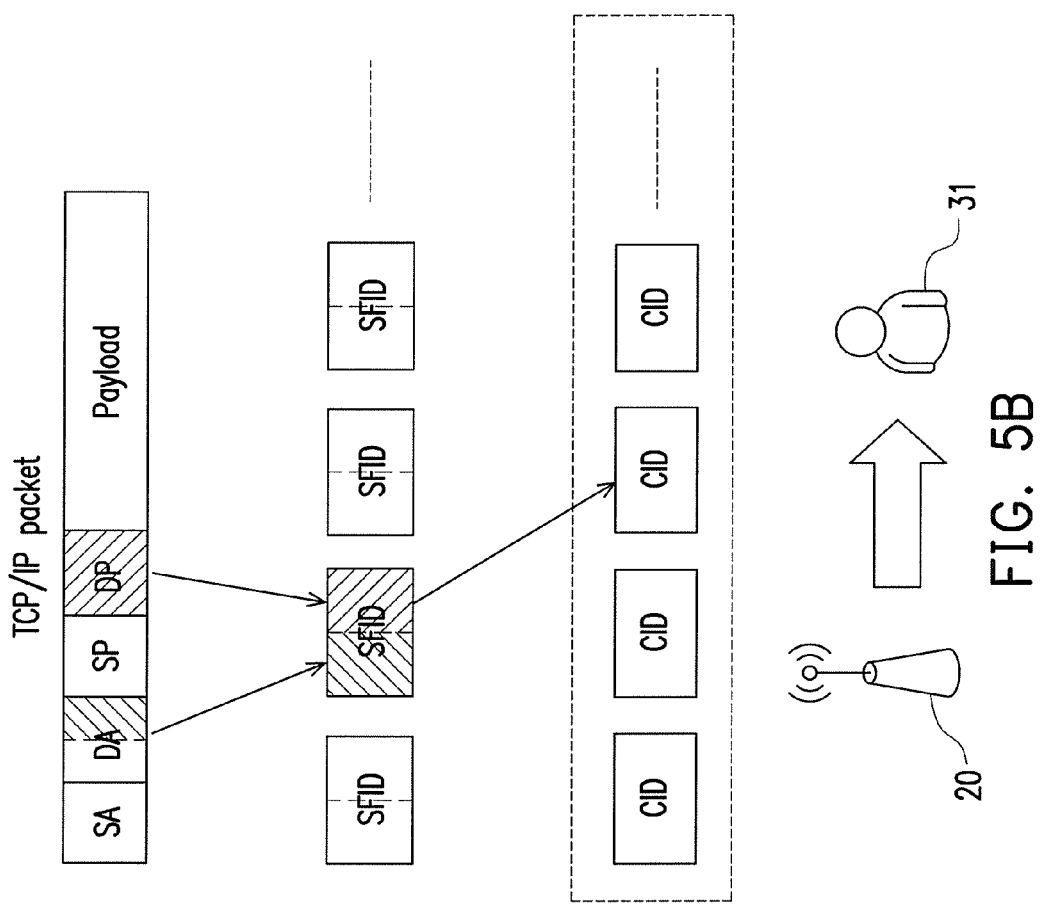
FIG. 5B is a schematic diagram illustrating a method for generating and utilizing a downlink identifier according to an embodiment of the present invention.

FIG. 5B is a schematic diagram illustrating a method for generating and utilizing a downlink identifier according to an embodiment of the present invention. Referring to FIG. 2, FIG. 4 and FIG. 5B, assuming the packet is transmitted from the server 41 to the SS 31 through the BS 20. When the BS 20 is about to transmit the packet to the SS 31, the BS 20 retrieves 16 bits of the DP in the packet, and 16 bits of the DA in the packet (step S401). Now, the DP and DA in the packet respectively represent the port and the IP address of the SS 31. Namely, the 16 bits of the DP and DA are respectively 22 (16 bits) and 88.123 (16 bits).

Next, the BS 20 retrieves the 16 bits of the DP of the packet to serve as the rear 16 bits of the SFID, and severs the 16 bits of the DA of the packet as the front 16 bits of the SFID (step S402). Namely, the SFID is 0x587B0016 (32 bits). On the other hand, the BS 20 can also retrieve the 16 bits of the DP of the packet to serve as the CID (step S402). Namely, the CID is 0x0016 (16 bits). Next, the BS 20 transmits the packet to the SS 31 according to the above SFID and the CID. In the following content, the method of the present embodiment is compared to the conventional method.

Table one is a comparison table of the method of the present embodiment and the conventional method. According to the conventional method of assigning the SFID to the TCP/IP packet by looking up the table, the corresponding SFID has to be searched from a data table one by one, so that a complexity thereof is O(NlogN), wherein N represents a number of data, for example, the number of data of a SFID data table or a CID data table. Comparatively, in the method of the present embodiment, the SFID can be obtained according to the IP address and the port of the SS in the TCP/IP packet header.

On the other hand, the conventional method of assigning the CID corresponding to the SFID also requires searching, so that the complexity thereof is O(NlogN). Comparatively, according to the method of the present embodiment, the CID can be directly obtained according to the SS port, so that the complexity thereof is O(1).

Next, memory spaces for recording the required data are compared. In the conventional table lookup method, for a corresponding relation of each of the SF data, besides the 32 bits SFID is recorded, the SA (32 bits), SP (16 bits), DA (32 bits) and DP (16 bits) are also recorded (total 128 bits), so that the totally required memory space is $N*2^7$. Comparatively, in the method of the present embodiment, only the 32 bits SFID is recorded for management, so that the totally required memory space is $N*2^5$.

Table one, comparison of the method of the present embodiment and the conventional method.

|  | Conventional method | Method of the present embodiment |
|---|---|---|
| Complexity of assigning the SFID | O(NlogN) | O(1) |
| Complexity of assigning the CID | O(NlogN) | O(1) |
| Required memory space | $N * 2^7$ | $N * 2^5$ |

It should be mentioned that though a possible pattern of the communication system and the method for generating and identifying the identifier has been described in the above embodiment, it should be understood by those skilled in the art that design of the communication system and the method for generating and identifying the identifier vary with manufacturers, thus, application of the present invention should not be limited to the possible pattern. In other words, the spirit of the present invention is met as long as a subclass of a port or an IP address in a packet header is retrieved to serve as a part of the identifier. To fully convey the concept of the present invention to those skilled in the art, embodiments are provided below for describing the present invention in detail.

In the aforementioned embodiment, though the SFID and the CID can be obtained without table lookup, those skilled in the art should understand that the SFID and the CID can also be obtained by looking up table according to the spirit of the present invention.

Moreover, though the identifier of the above embodiment is the SFID, the present invention is not limited thereto, and in other embodiments, the identifier can also be a traffic flow identifier, a quality of service (QoS) flow identifier, a logical connection identifier or other similar identifiers.

In addition, in the aforementioned embodiment, though 16 bits of the SS port and 16 bits of the SS IP address are directly retrieved to serve as the SFID, and 16 bits of the SS port are directly retrieved to serve as the CID, the present invention is not limited thereto. In other embodiments, different number of bits of the SS port can be retrieved to generate the SFID or the CID, or different number of bits of the SS IP address can be retrieved to generate the SFID. For example, a BS that manages $2^N$ SSs can retrieve rear N bits of the SS IP address to generate the SFID, wherein N is a predetermined positive integer. Moreover, those skilled in the art can change an obtaining method of the SFID and the CID according to actual requirements. For example, FIG. 6 is a schematic diagram illustrating a method for generating and assigning the SFID and the CID according to another embodiment of the present invention.

Figure 6:
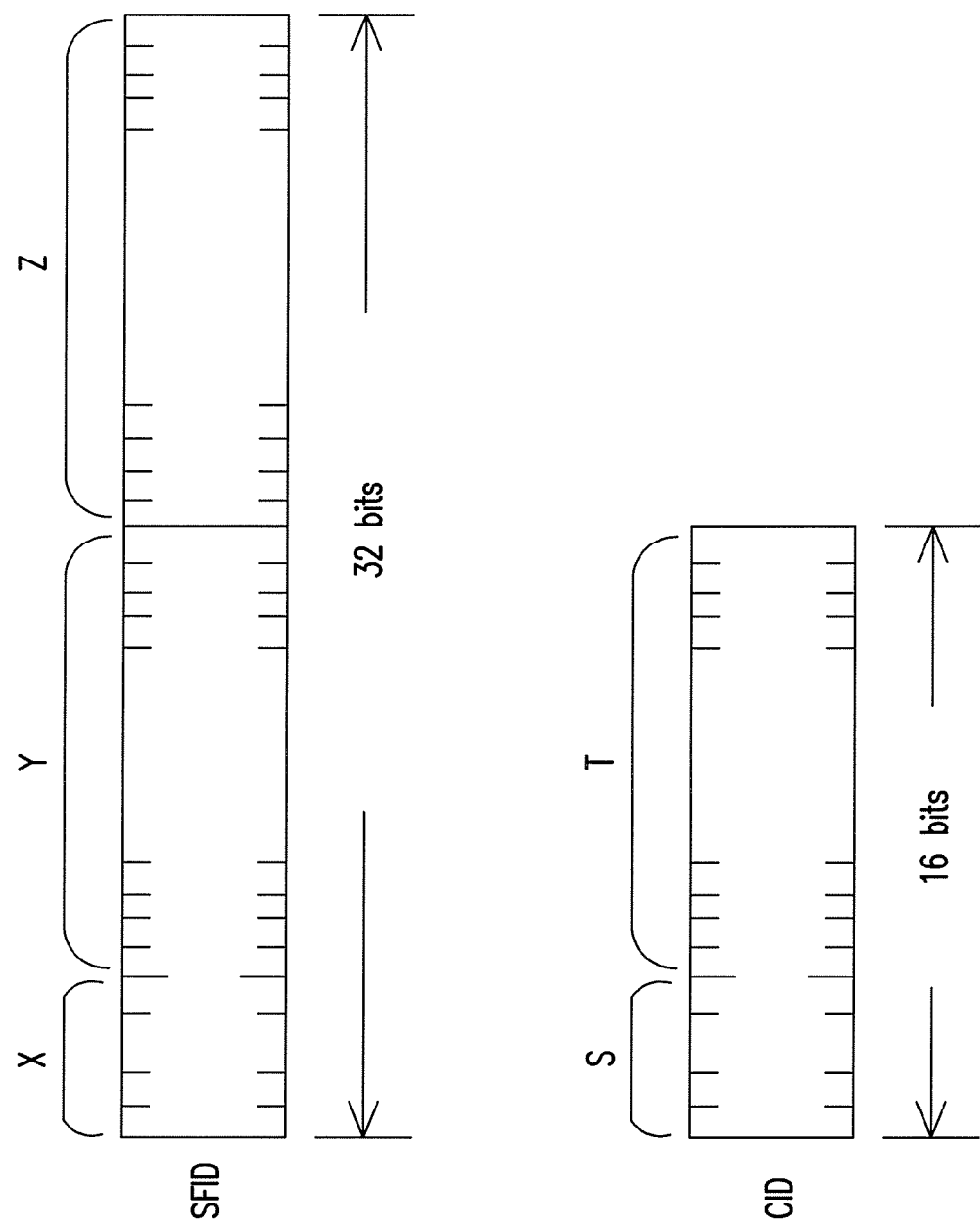
FIG. 6 is a schematic diagram illustrating a method for generating and assigning a SFID and a CID according to another embodiment of the present invention.

Referring to FIG. 6, in the present embodiment, the SFID (32 bits) is consisted of three parts, which are respectively X, Y and Z. Y can be retrieved from the SS port, and Z can be retrieved from a plurality of the bits of the SS IP address. In the present embodiment, certain logical operations can be performed so that a length of Y plus Z can be less than 32 bits, and an insufficient part thereof is compensated by X.

It should be noted that to achieve an additional management function, for example, QoS or accounting management, the X part can be generated according to the packet header and/or internal information and/or external information of the BS. The so-called internal information of the BS refers to information generated at internal of the BS, and the so-called external information refers to information came from network signal or other devices. Value of the packet header, the internal and external information of the BS may represent a QoS, a priority level, a user identifier or an accounting project. The X part can be generated based on calculation or table lookup.

The CID (16 bits) is consisted of two parts of S and T. The T part can be retrieved from the SS port. In the present embodiment, certain logical operations can be performed so that a length of T can be less than 16 bits, and an insufficient part thereof is compensated by S. S can be generated according to the packet header and/or internal information and/or external information of the BS. For example, value of the packet header, the internal and external information of the BS may represent the QoS, the priority level, the user identifier or the accounting project. The S part can be generated based on calculation or table lookup.

Moreover, in the present embodiment, though the transport-CID is taken as an example, the present invention is not limited thereto. In other embodiments, the CID can also be a basic-CID, a primary-CID or a secondary-CID. The above three kinds of CID have to be unique. To avoid a problem of identifier collision or CID conflict due to utilization of the same identifier, during generation of the CID, the SS port can be first retrieved. Next, the SS port can be operated with other information, for example, the SS IP address. Finally, the operation result can serve as the CID.

In summary, a subclass of one of a port in a packet header is retrieved to serve as a part of the identifier.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for generating and identifying an identifier, adapted to a first device of a communication system, the method comprising:
    retrieving a subclass of a port of the packet;
    generating an identifier by using the subclass of the port as a first part of the identifier;
    retrieving a subclass of an address of a packet;
    serving the subclass of the address as a second part of the identifier, wherein the first device transmits the packet to a second device according to the identifier; and
    generating another identifier by using the subclass of the port, wherein the subclass of the port is obtained from the identifier, and the first device transmits the packet to the second device according to the identifier and the another identifier.

2. The method for generating and identifying an identifier as claimed in claim 1 further comprising:
    generating a third part of the identifier according to a head field of the packet or an information.

3. The method for generating and identifying an identifier as claimed in claim 1, wherein the identifier is a service flow identifier (SFID), a traffic flow identifier, a quality of service (QoS) flow identifier or a logical connection identifier.

4. The method for generating and identifying an identifier as claimed in claim 1, wherein the subclass of the address is a plurality of bits of the address.

5. The method for generating and identifying an identifier as claimed in claim 1, wherein the first device is a transmitting station of the communication system, the second device is a receiving station of the communication system, the address is a destination address of the packet, and the port is a destination port of the packet.

6. The method for generating and identifying an identifier as claimed in claim 1, wherein the first device is a receiving station of the communication system, the second device is a transmitting station of the communication system, the address is a source address of the packet, and the port is a source port of the packet.

7. The method for generating and identifying an identifier as claimed in claim 1, wherein the other identifier is a transport-CID.

8. A communication system, comprising:
a first device, for generating an identifier, the identifier comprising a first part and a second part, wherein the first part of the identifier is generated according to a subclass of a port of a packet, and the second part of the identifier is generated according to a subclass of an address of the packet; and
a second device, wherein the first device transmits the packet to the second device according to the identifier, wherein
the first device further generating another identifier by using the subclass of the port as a first part of the another identifier, wherein the subclass of the port is obtained from the identifier, and the first device transmits the packet to the second device according to the identifier and the another identifier.

9. The communication system as claimed in claim 8, wherein the first device further generates a third part of the identifier according to a head field of the packet or an information.

10. The communication system as claimed in claim 8, wherein the identifier is a SFID, a traffic flow identifier, a QoS flow identifier or a logical connection identifier.

11. The communication system as claimed in claim 8, wherein the subclass of the address is a plurality of bits of the address.

12. The communication system as claimed in claim 8, wherein the first device is a transmitting station of the communication system, the second device is a receiving station of the communication system, the address is a destination address of the packet, and the port is a destination port of the packet.

13. The communication system as claimed in claim 8, wherein the first device is a receiving station of the communication system, the second device is a transmitting station of the communication system, the address is a source address of the packet, and the port is a source port of the packet.

14. The communication system as claimed in claim 8, wherein the other identifier is a transport-CID.

* * * * *